US008000482B2

(12) United States Patent
Lambert et al.

(10) Patent No.: US 8,000,482 B2
(45) Date of Patent: Aug. 16, 2011

(54) MICROPHONE ARRAY PROCESSING SYSTEM FOR NOISY MULTIPATH ENVIRONMENTS

(75) Inventors: Russell H. Lambert, Fountain Valley, CA (US); Shi-Ping Hsu, Pasadena, CA (US); Karina L. Edmonds, Pasadena, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1776 days.

(21) Appl. No.: 11/197,817

(22) Filed: Aug. 5, 2005

(65) Prior Publication Data

US 2005/0281415 A1 Dec. 22, 2005

Related U.S. Application Data

(63) Continuation of application No. 09/388,010, filed on Sep. 1, 1999, now abandoned.

(51) Int. Cl.
*H04B 15/00* (2006.01)

(52) U.S. Cl. ...................... 381/94.7; 381/94.1; 381/94.3

(58) Field of Classification Search ................. 381/94.7, 381/94.1, 94.3
See application file for complete search history.

(56) References Cited

U.S. PATENT DOCUMENTS 6,317,501 B1 * 11/2001 Matsuo .......................... 381/92
6,332,028 B1 * 12/2001 Marash .......................... 381/92
6,453,285 B1 * 9/2002 Anderson et al. ............. 704/210
6,654,468 B1 * 11/2003 Thompson ...................... 381/92

* cited by examiner

*Primary Examiner* — Devona E Faulk
*Assistant Examiner* — George Monikang
(74) *Attorney, Agent, or Firm* — Tarolli, Sundheim, Covell & Tummino LLP

(57) ABSTRACT

Apparatus and a corresponding method for processing speech signals in a noisy reverberant environment, such as an automobile. An array of microphones (10) receives speech signals from a relatively fixed source (12) and noise signals from multiple sources (32) reverberated over multiple paths. One of the microphones is designated a reference microphone and the processing system includes adaptive frequency impulse response (FIR) filters (24) enabled by speech detection circuitry (21) and coupled to the other microphones to align their output signals with the reference microphone output signal. The filtered signals are then combined in a summation circuit (18). Signal components derived from the speech signal combine coherently in the summation circuit, while noise signal components combine incoherently, resulting in composite output signal with an improved signal-to-noise ratio. The composite output signal is further processed in a speech conditioning circuit (20) to reduce the effects of reverberation.

21 Claims, 5 Drawing Sheets

MICROPHONE ARRAY PROCESSING SYSTEM FOR NOISY MULTIPATH ENVIRONMENTS

CROSS-REFERENCE TO RELATED APPLICATION

This application is a continuation of application Ser. No. 09/388,010, now abandoned, which was filed Sep. 1, 1999 and entitled Microphone Array Processing System for Noisy Multipath Environments, which is incorporated herein by reference.

BACKGROUND OF THE INVENTION

This invention relates generally to techniques for reliable conversion of speech data from acoustic signals to electrical signals in an acoustically noisy and reverberant environment. There is a growing demand for "hands-free" cellular telephone communication from automobiles, using automatic speech recognition (ASR) for dialing and other functions. However, background noise from both inside and outside an automobile renders in-vehicle communication both difficult and stressful. Reverberation within the automobile combines with high noise levels to greatly degrade the speech signal received by a microphone in the automobile. The microphone receives not only the original speech signal but also distorted and delayed duplicates of the speech signal, generated by multiple echoes from walls, windows and objects in the automobile interior. These duplicate signals in general arrive at the microphone over different paths. Hence the term "multipath" is often applied to the environment. The quality of the speech signal is extremely degraded in such an environment, and the accuracy of any associated ASR systems is also degraded, perhaps to the point where they no longer operate. For example, recognition accuracy of ASR systems as high as 96% in a quiet environment could drop to well below 50% in a moving automobile.

Another related technology affected by a noise and reverberation is speech compression, which digitally encodes speech signals to achieve reductions in communication bandwidth and for other reasons. In the presence of noise, speech compression becomes increasingly difficult and unreliable.

In the prior art, sensor arrays have been used or suggested for processing narrowband signals, usually with a fixed uniformly spaced microphone array, with each microphone having a single weighting coefficient. There are also wideband array signal processing systems for speech applications. They use a beam-steering technique to position "nulls" in the direction of noise or jamming sources. This only works, of course, if the noise is emanating from one or a small number of point sources. In a reverberant or multipath environment, the noise appears to emanate from many different directions, so noise nulling by conventional beam steering is not a practical solution.

There are also a number of prior art systems that effect active noise cancellation in the acoustic field. Basically, this technique cancels acoustic noise signals by generating an opposite signal, sometimes referred to as "anti-noise," through one or more transducers near the noise source, to cancel the unwanted noise signal. This technique often creates noise at some other location in the vicinity of the speaker, and is not a practical solution for canceling multiple unknown noise sources, especially in the presence of multipath effects.

Accordingly, there is still a significant need for reduction of the effects of noise in a reverberant environment, such as the interior of a moving automobile. As discussed in the following summary, the present invention addresses this need.

SUMMARY OF THE INVENTION

The present invention resides in a system and related method for noise reduction in a reverberant environment, such as an automobile. Briefly, and in general terms, the system of the invention comprises a plurality of microphones positioned to detect speech from a single speech source and noise from multiple sources, and to generate corresponding microphone output signals, one of the microphones being designated a reference microphone and the others being designated data microphones. The system further comprises a plurality of bandpass filters, one for each microphone, for eliminating from the microphone output signals a known spectral band containing noise; a plurality of adaptive filters, one for each of the data microphones, for aligning each data microphone output signal with the output signal from the reference microphone; and a signal summation circuit, for combining the filtered output signals from the microphones. Signal components resulting from the speech source combine coherently and signal components resulting from multiple noise sources combine incoherently, to produce an increased signal-to-noise ratio. The system may also comprise speech conditioning circuitry coupled to the signal summation circuit, to reduce reverberation effects in the output signal.

More specifically, each of the adaptive filters includes means for filtering data microphone output signals by convolution with a vector of weight values; means for comparing the filtered data microphone output signals from one of the data microphones with reference microphone output signals and deriving therefrom an error signal; and means for adjusting the weight values convolved with the data microphone output signals to minimize the error signal. In the preferred embodiment of the invention, each of the adaptive filters further includes fast Fourier transform means, to transform successive blocks of data microphone output signals to a frequency domain representation to facilitate real-time adaptive filtering.

The invention may also be defined in terms of a method for improving detection of speech signals in noisy environments. Briefly, the method comprises the steps of positioning a plurality of microphones to detect speech from a single speech source and noise from multiple sources, one of the microphones being designated a reference microphone and the others being designated data microphones; generating microphone output signals in the microphones; filtering the microphone output signals in a plurality of bandpass filters, one for each microphone, to eliminate from the microphone output signals a known spectral band containing noise; adaptively filtering the microphone output signals in a plurality of adaptive filters, one for each of the data microphones, and thereby aligning each data microphone output signal with the output signal from the reference microphone; and combining the adaptively filtered output signals from the microphones in a signal summation circuit. The incoming speech from one or multiple microphones is monitored to determine when speech is present. The adaptive filters are only allowed to adapt while speech is present. Signal components resulting from the speech source combine coherently in the signal summation circuit and signal components resulting from noise combine incoherently, to produce an increased signal-to-noise ratio. The method may further comprise the step of conditioning the combined signals in speech conditioning circuitry coupled to the signal summation circuit, to reduce reverberation effects in the output signal.

More specifically, the step of adaptively filtering includes filtering data microphone output signals by convolution with a vector of weight values; comparing the filtered data microphone output signals from one of the data microphones with reference microphone output signals and deriving therefrom an error signal; adjusting the weight values convolved with the data microphone output signals to minimize the error signal; and repeating the filtering, comparing and adjusting steps to converge on a set of weight values that results in minimization of noise effects.

In the preferred embodiment of the invention, the step of adaptively filtering further includes obtaining a block of data microphone signals; transforming the block of data to a frequency domain using a fast Fourier transform; filtering the block of data in the frequency domain using a current best estimate of weighting values; comparing the filtered block of data with corresponding data derived from the reference microphone; updating the filter weight values to minimize any difference detected in the comparing step; transforming the filter weight values back to the time domain using an inverse fast Fourier transform; zeroing out portions of the filter weight values that give rise to unwanted circular convolution; and converting the filter values back to the frequency domain.

It will be appreciated from the foregoing summary that the present invention represents a significant advance in speech communication techniques, and more specifically in techniques for enhancing the quality of speech signals produced in a noisy environment. The invention improves signal-to-noise performance and reduces the reverberation effects, providing speech signals that are more intelligible to users. The invention also improves the accuracy of automatic speech recognition systems. Other aspects and advantages of the invention will become apparent from the following more detailed description, taken in conjunction with the accompanying drawings.

DESCRIPTION OF THE PREFERRED EMBODIMENTS

Figure 1:
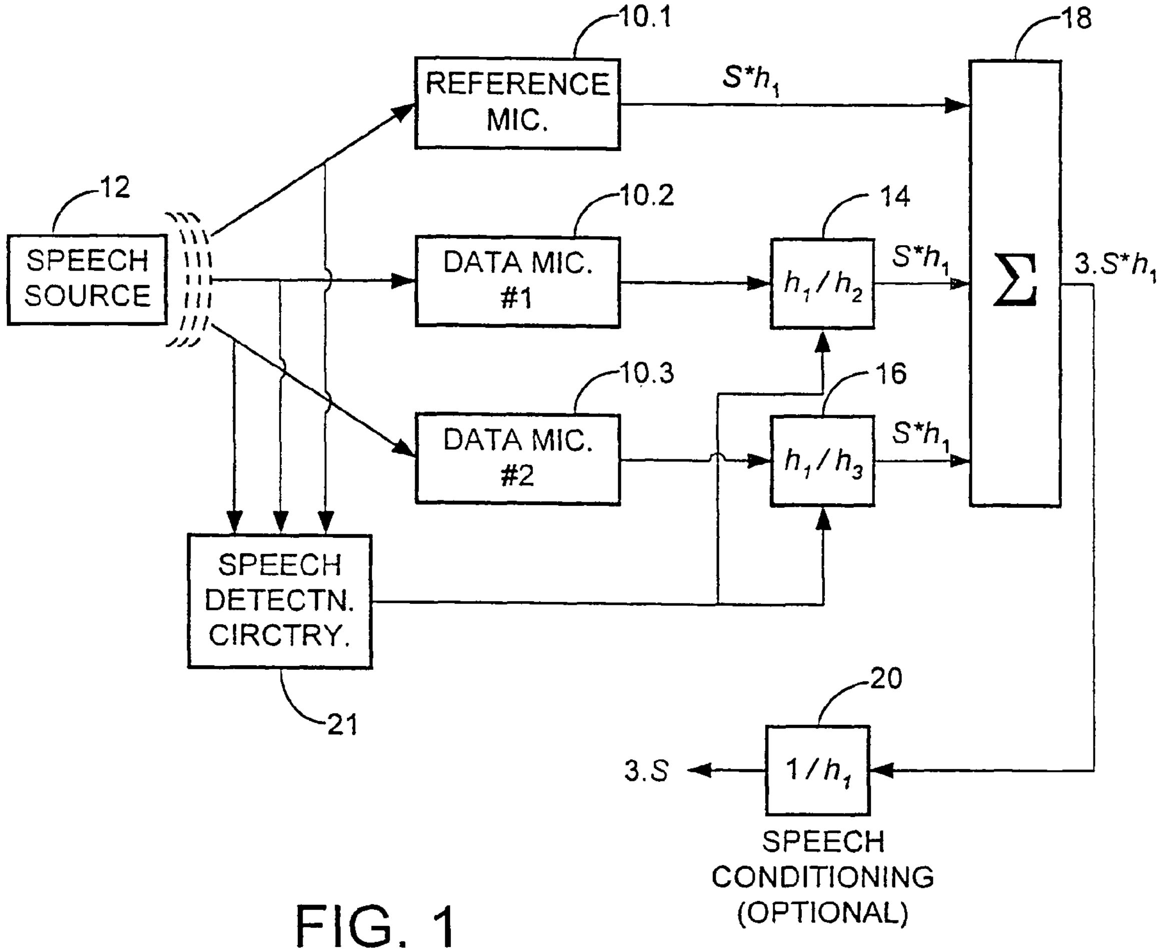
FIG. 1 is a block diagram depicting an important aspect of the invention, wherein signal amplitude is increased by coherent addition of filtered signals from multiple microphones.

As shown in the drawings, the present invention is concerned with a technique for significantly reducing the effects of noise in the detection or recognition of speech in a noisy and reverberant environment, such as the interior of a moving automobile. The quality of speech transmission from mobile telephones in automobiles has long been known to be poor much of the time. Noise from within and outside the vehicle result in a relatively low signal-to-noise ratio and reverberation of sounds within the vehicle further degrades the speech signals. Available technologies for automatic speech recognition (ASR) and speech compression are at best degraded, and may not operate at all in the environment of the automobile.

In accordance with the present invention, use of an array of microphones and its associated processing system results in a significant improvement in signal-to-noise ratio, which enhances the quality of the transmitted voice signals, and facilitates the successful implementation of such technologies as ASR and speech compression.

The present invention operates on the assumption that noise emanates from many directions. In a moving automobile, noise sources inside and outside the vehicle clearly do emanate from different directions. Moreover, after multiple reflections inside the vehicle, even noise from a point source reaches a microphone from multiple directions. A source of speech, however, is assumed to be a point source that does not move, at least not rapidly. Since the noise comes from many directions it is largely independent, or uncorrelated, at each microphone. The system of the invention sums signals from N microphones and, in so doing, achieves a power gain of $N^2$ for the signal of interest, because the amplitudes of the individual signals from the microphones sum coherently, and power is proportional to the square of the amplitude. Because the noise components obtained from the microphones are incoherent, summing them together results in an incoherent power gain proportional to N. Therefore, there is a signal-to-noise ratio improvement by a factor of $N^2/N$, or N.

FIG. 1 shows an array of three microphones, indicated at 10.1, 10.2 and 10.3, respectively. Microphone 10.1 is designated the reference microphone and the other two microphones are designated data microphones. Each microphone receives an acoustic signal S from a speech source 12. For purposes of explanation, in this illustration noise is considered to be absent. The acoustic transfer functions for the three microphones are $h_1$, $h_2$ and $h_3$, respectively. Thus, the electrical output signals from the microphones are $S*h_1$, $S*h_2$ and $S*h_3$, respectively. The signals from the data microphones 10.2 and 10.3 are processed as shown in blocks 14 and 16, respectively, to allow them to be combined with each other and with the reference microphone signal. In block 14, the acoustic path transfer function $h_2$ is inverted and the reference acoustic path transfer function $h_1$ is applied, to yield the signs $S*h_1$. Similarly, in block 16, the function $h_3$ is inverted and the function $h_1$ is applied, to yield the signal $S*h_1$. The three microphone signals are then applied to a summation circuit 18, which yields at output of $3 \cdot S*h_1$. This signal is then processed by speech conditioning circuitry 20, which effectively inverts the transfer function $h_1$ and yields the resulting signal amplitude 3S. An array of N microphones would yield an effective signal amplitude gain of N (a power gain of $N^2$).

The incoming speech to one or multiple microphones 10 is monitored in speech detection circuitry 21 to determine when speech is present. The functions performed in blocks 14 and 16 are performed only when speech is detected by the circuitry 21.

The signal gain obtained from the array of microphones is not dependent in any way on the geometry of the array. One requirement for positioning the microphones is that they be close enough to the speech source to provide a strong signal.

A second requirement is that the microphones be spatially separated. This spatial separation is needed so that independent noises are sampled. Similarly, noise reduction in accordance with the invention is not dependent on the geometry of the microphone array.

The purpose of the speech conditioning circuitry 20 is to modify the spectrum of the cumulative signal obtained from the summation circuit 18 to resemble the spectrum of "clean" speech obtained in ideal conditions. The amplified signal obtained from the summation circuit 18 is still a reverberated one. Some improvement is obtained by equalizing the magnitude spectrum of the output signal to match a typical representative clean speech spectrum. A simple implementation of the speech conditioning circuitry 20, therefore, includes an equalizer that selectively amplifies spectral bands of the output signal to render the spectrum consistent with the clear speech spectrum. A more advanced form of speech conditioning circuitry is a blind equalization process specially tailored for speech. (See, for example, Lambert, R. H. and Nikias, C. L., "Blind Deconvolution of Multipath Mixtures," Chapter from *Unsupervised Adaptive Filtering*, Vol. 1, edited by Simon Haykin, John Wiley & Sons, 1999.) This speech conditioning process is particularly important when an ASR system is "trained" using clean speech samples. Optimum results are obtained by training the ASR system using the output of the present invention under typical noisy environmental conditions.

Figure 2:
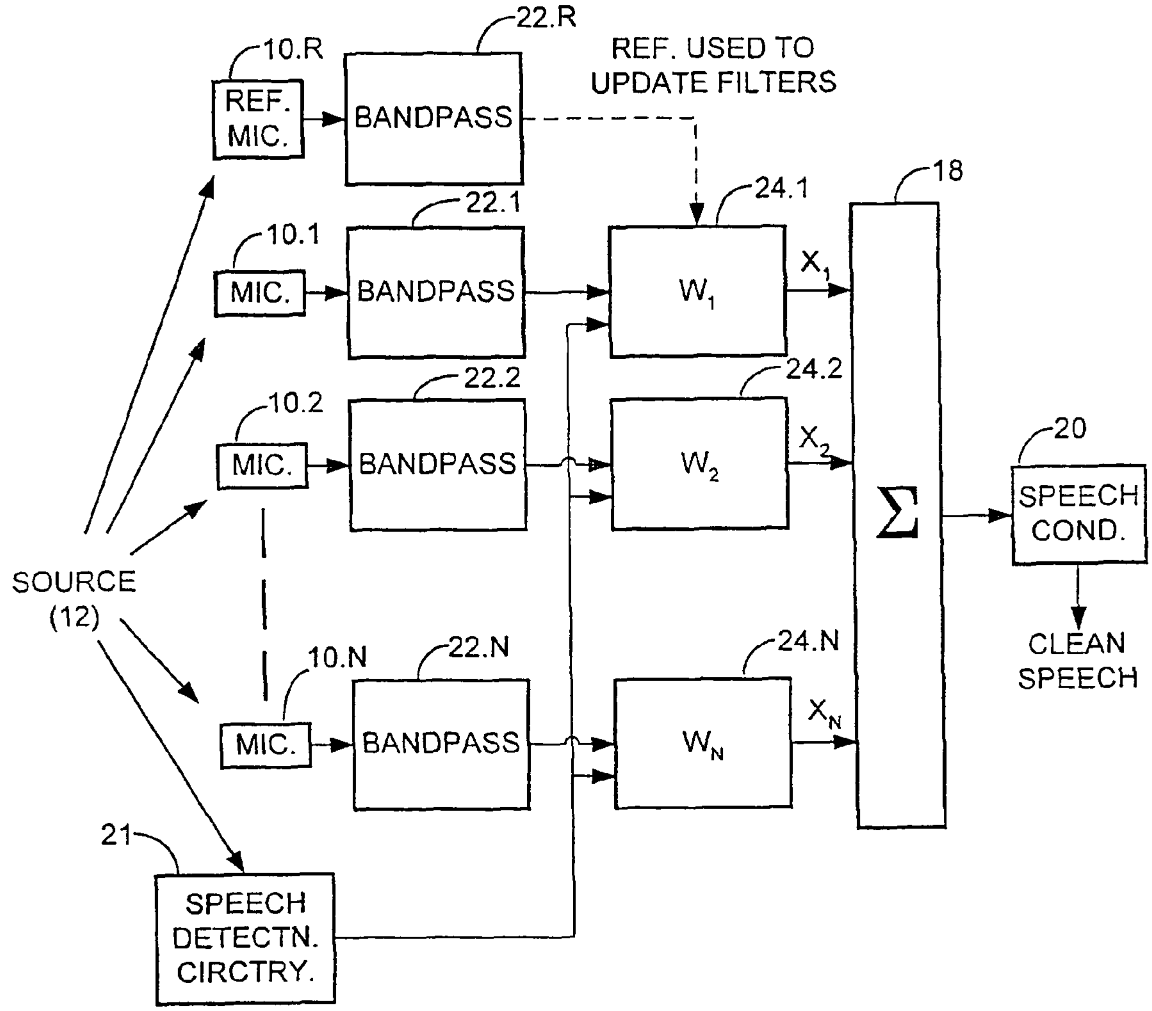
FIG. 2 is another block diagram showing a microphone array in accordance with the invention, and including bandpass filters, speech detection circuitry, adaptive filters, a signal summation circuit, and speech conditioning circuitry.

FIG. 2 depicts the invention in principle, showing the speech source 12, a reference microphone 10.R, and N data microphones indicated at 10.1 through 10.N. The output from the reference microphone 10.R is coupled to a bandpass filter 22.R and the outputs from the data microphones 10.1 through 10.N are coupled to similar bandpass filters 22.1 through 22.N, respectively. A great deal of environmental noise lies in the low frequency region of approximately 0-300 Hz. Therefore, it is advantageous to remove energy in this region to provide an improvement in signal-to-noise ratio.

The outputs of the bandpass filters 22.1 through 22.N are connected to adaptive filters 24.1 through 24.N, respectively, indicated in the figure as $W_1$ through $W_N$, respectively. These filters are functionally equivalent to the filters 14 and 16 in FIG. 1. The outputs of the filters 24, indicated as values $X_1$ through $X_N$, are input to the summation circuit 18, the output of which is processed by speech conditioning circuitry 20, as discussed with reference to FIG. 1. As indicated by the arrow 26, output signals from the reference bandpass filter 22.R are used to update the filters $W_1$ through $W_N$ periodically, as will be discussed with reference to FIGS. 3 and 4. Speech detection circuitry 21 enables the filters 24 only when speech is detected.

Figure 3A:
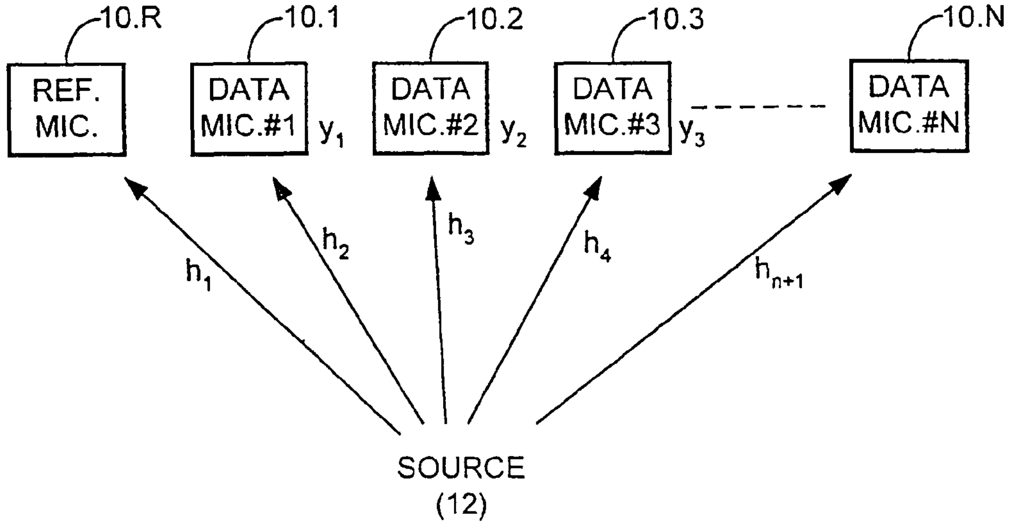
FIGS. 3A and 3B together depict another block diagram of the invention, including more detail of adaptive filters coupled to receive microphone outputs.
Figure 3B:
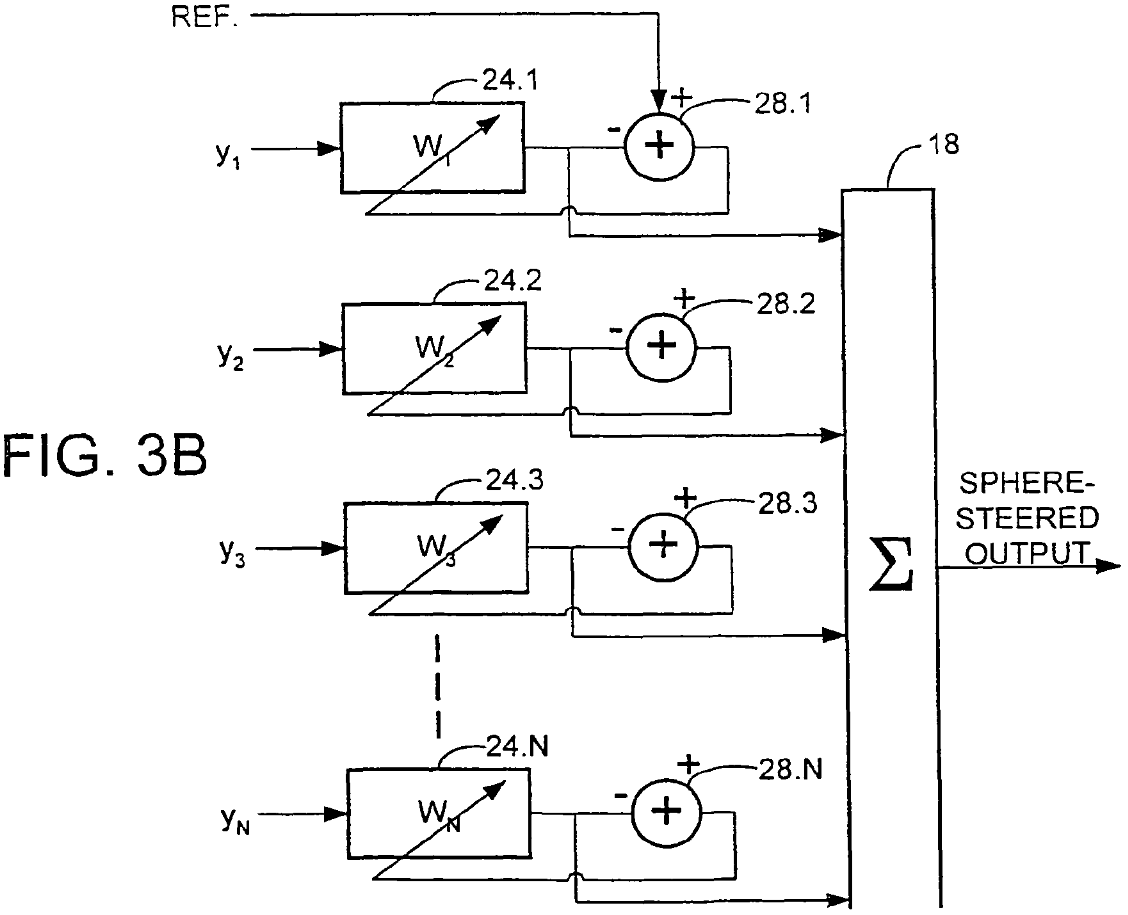

FIGS. 3A and 3B show the configuration of FIG. 2 in more detail, but without the bandpass filters 22 of FIG. 2. FIG. 3A shows the same basic configuration of microphones 10R and 10.1 through 10.N, each receiving acoustic signals from the speech source 12. FIG. 3B shows the filters $W_1$ 24.1 through $W_N$ 24.N in relation to incoming signals $y_1$ through $y_N$ from the data microphones 10.1 through 10.N. Each of the W filters 24.1 through 24.N has an associated summing circuit 28.1 through 28.N connected to its output. In each summing circuit, the output of the W filter 24 is subtracted from a signal from the reference microphone 22.R transmitted over line 30 to each of the summing circuits. The result is an error signal that is fed back to the corresponding W filter 24, which is continually adapted to minimize the error signal.

Figure 4:
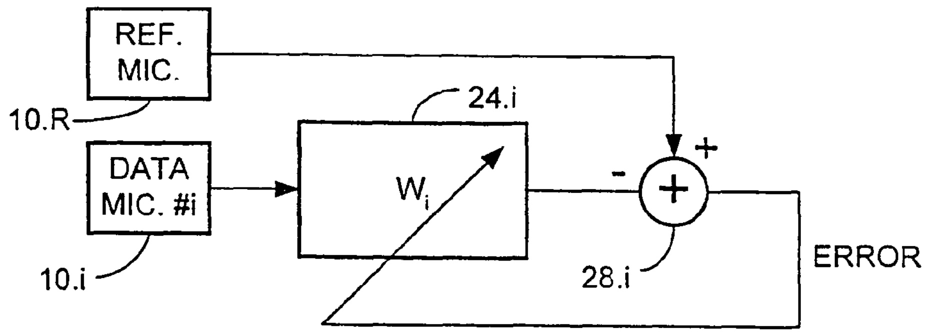
FIG. 4 is a block diagram showing detail of a single adaptive filter used in the invention.

FIG. 4 shows this filter adaptation process in general terms, wherein the $i^{th}$ filter $W_i$ is shown as processing the output signal from the $i^{th}$ data microphone. Adaptive filtering follows conventional techniques for implementing finite impulse response (FIR) filters and can be performed in either the time domain or the frequency domain. In the usual time domain implementation of an adaptive filter, $W_i$ is a weight vector, representing weighting factors applied to successive outputs of a tapped delay line that forms a transversal filter. In a conventional LMS adaptive filter, the weights of the filter determine its impulse response, and are adaptively updated in the LMS algorithm. Frequency domain implementations have also been proposed, and in general require less computation than the time domain approach. In a frequency domain approach, it is convenient to group the data into blocks and to modify the filter weights only after processing each block.

In the preferred embodiment of the invention, the adaptive filter process is a block frequency domain LMS (least mean squares) adaptive update procedure similar to that described in a paper by E. A. Ferrara, entitled "Fast Implementation of LMS Adaptive Filters," IEEE Trans. On Acoustics, Speech and Signal Processing, Vol. ASSP-28, No. 4, 1980, pp 474-475. The error signal computed in summing circuit 28.*i* is given by (Reference mic.) $-y_i*W_i$. In digital processing of successive blocks of data, one adaptive step of $W_i$ may be represented by the expression:

$$W_i(k+1)=W_i(k)+\mu(REF(k)-y_i*W_i(k))*conj(Y_i(k)),$$

where k is the data block number and $\mu$ is a small adaptive step.

The process described by Ferrara has been modified to provide greater efficiency in a real-time system. The modification entails converting the filters to the time domain, zeroing the portions of the filters that give rise to circular convolution, and then returning the filters to the frequency domain. More specifically, for each data block k, the following steps are performed:

- Obtain a block of data from the reference microphone and convert the data to the frequency domain. REF(k)=fft(ref(k)). New data read in is less than one-half of the FFT (fast Fourier transform) size, following a conventional process known as the overlap and save method.
- For each sensor i=1 to N, perform the following steps:
  - Obtain a block of data $y_i(k)$ from microphone i and transform it to the frequency domain. $Y_i(k)=fft(y_i(k))$.
  - Filter the frequency domain block with the current best estimate of $w_i$ to obtain $X_i(k)=W_i(k)*Y_i(k)$.
  - Update the filter using $W_i(k+1)=W_i(k)+\mu(REF(k)-X_i(k))*conj(Y_i)$.
  - Convert the frequency domain filter back to the time domain. $W_i(k+1)=ifft(W_i(k+1))$.
  - Zero out portions of $w_i(k+1)$.
  - Convert back to the frequency domain. $W_i(k+1)=fft(w_i(k+1))$.

Figure 5:
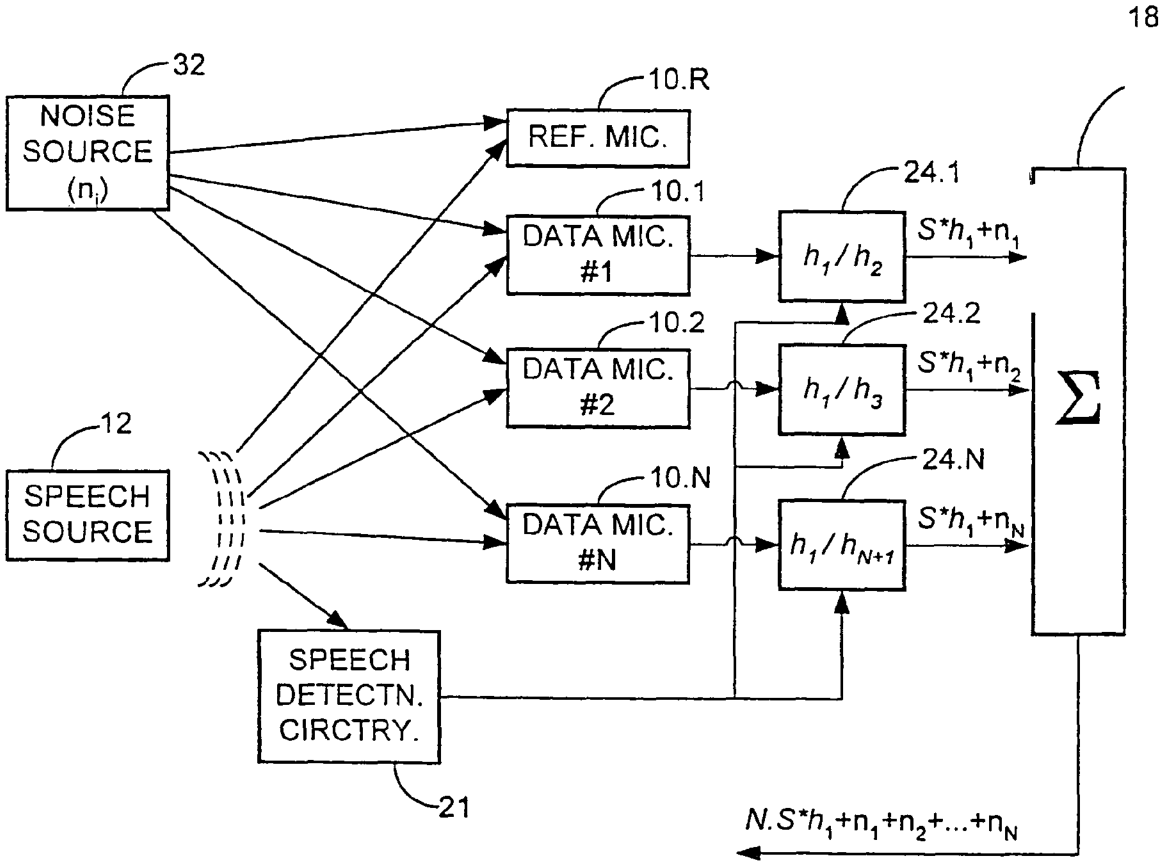
FIG. 5 is another block diagram of the invention, showing how noise signal components are effectively reduced in accordance with the invention.

FIG. 5 shows the system of the invention processing speech from the source 12 and noise from multiple sources referred to generally by reference numeral 32. In the summation circuit 18, the speech signal contributions from the data microphones are added coherently, as previously discussed, to produce a speech signal proportional to $N\cdot S*h_1$, and this signal can be conveniently convolved with the transfer function $h_1$ to produce a larger speech signal $N\cdot S$. The speech signals, being coherent, combine in amplitude, and since the power of a sinusoidal signal is proportional to the square of its amplitude, the speech signal power from N sensors will be $N^2$ times the power from a single sensor. In contrast, the noise components sensed by each microphone come from many different directions, and combine incoherently in the summation circuit 18. The noise components may be represented by the summation: $n_1+n_2+\ldots+n_N$. Because these contributions are incoherent, their powers combine as N but their root mean square (RMS) amplitudes combine as $\sqrt{N}$. The cumulative noise power from the N sensors is, therefore, increased by a factor N, and the signal-to-noise ratio (the ratio of signal power to noise power) is increased by a factor $N^2/N$, or N. As in the previously described embodiments of the invention, speech detection circuitry 21 enables the filters 24 only when speech is detected by the circuitry.

Theoretically, if the number of sensors is doubled the single-to-noise ratio should also double, i.e. show an improvement of 3 dB (decibels). In practice, the noise is not perfectly independent at each microphone, so the signal-to-noise ratio improvement obtained from using N microphones will be somewhat less than N.

The effect of the adaptive filters in the system of the invention is to "focus" the system on a spherical field surrounding the source of the speech signals. Other sources outside this sphere tend to be eliminated from consideration and noise sources from multiple sources are reduced in effect because they are combined incoherently in the system. In an automobile environment, the system re-adapts in a few seconds when there is a physical change in the environment, such as when passengers enter or leave the vehicle, or luggage items are moved, or when a window is opened or closed.

Figure 6:
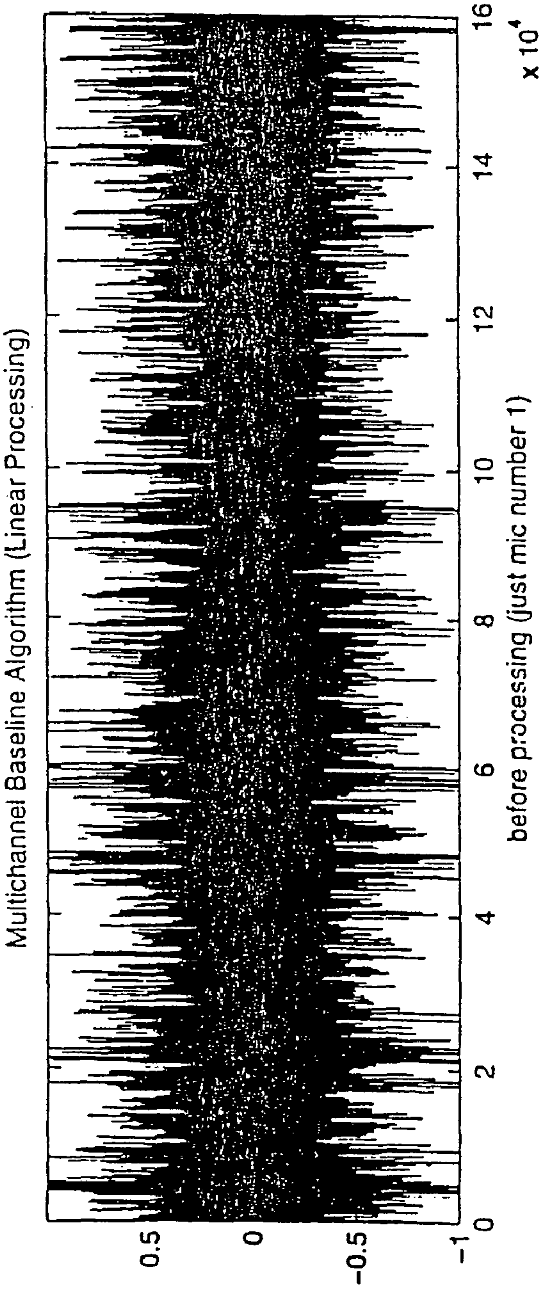
FIG. 6 is a graph showing a composite output signal from a single microphone detecting a single speaker in a noisy automobile environment.
Figure 7:
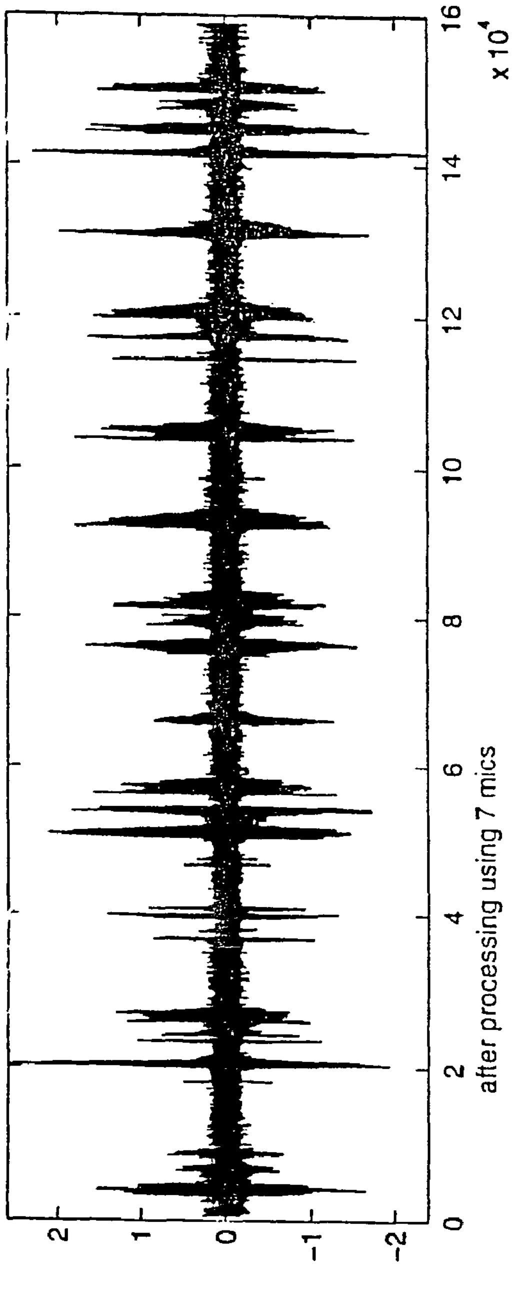
FIG. 7 is a graph showing a composite output signal obtained from an array of seven microphones in accordance with the invention, while processing speech from a single speaker in conditions similar to those encountered in the generation of the graph of FIG. 6.

FIGS. 6 and 7 show the improvement obtained by use of the invention. A composite output signal derived from a single microphone is shown in FIG. 6 and is clearly more noisy than a similar signal derived from seven microphones in accordance with the invention.

It will be appreciated from the foregoing that the present invention represents a significant advance in the field of microphone signal processing in noisy environments. The system of the invention adaptively filters the outputs of multiple microphones to align their signals with a common reference and allow signal components from a single source to combine coherently, while signal components from multiple noise sources combine incoherently and have a reduced effect. The effect of reverberation is also reduced by speech conditioning circuitry and the resultant signals more reliably represent the original speech signals. Accordingly, the system provides more acceptable transmission of voice signals from noisy environments, and more reliable operation of automatic speech recognition systems. It will also be appreciated that, although a specific embodiment of the invention has been described for purposes of illustration, various modifications may be made without departing from the spirit and scope of the invention. Accordingly, the invention should not be limited except as by the appended claims.

What is claimed is:

1. A microphone array processing system for performance enhancement in noisy environments, the system comprising:

a plurality of N microphones positioned to detect speech from a speech source and noise from at least one noise source and to generate corresponding microphone output signals, where N is a positive integer denoting a number of the plurality of microphones, one of the N microphones being designated a reference microphone and the other N−1 microphones being designated data microphones, the reference microphone and the data microphones receive acoustic signals both from the speech source and from the at least one noise source;

a plurality of adaptive filters, one for each of the data microphones, for aligning each data microphone output signal relative to the reference microphone output signal; and a signal summation circuit that sums the adaptively filtered microphone output signals with the reference microphone output signal such that signal components resulting from the speech source combine coherently to provide a speech signal having a power gain of approximately $N^2$ and such that the signal components resulting from noise combine incoherently to provide a noise signal having power gain of approximately N to produce a corresponding increased signal-to-noise ratio.

2. The system of claim 1, further comprising a plurality of bandpass filters configured to remove a known spectral band containing noise from each of the microphone output signals, the plurality of adaptive filters aligning each of the bandpass filtered output signals from the data microphones relative to the reference microphone output signal.

3. The system of claim 2, wherein the plurality of adaptive filters are updated based on the output signal from the bandpass filter that filters the reference microphone output signal.

4. The system of claim 3, wherein each of the plurality of adaptive filters is configured to update a filter weight value according to a block frequency domain least mean square adaptive update procedure.

5. The system of claim 1, wherein each of the plurality of adaptive filters further comprises a summation circuit that subtracts the output of a respective adaptive filter from the reference microphone output signal to provide a corresponding error signal, each of the plurality of adaptive filters adapting to minimize the corresponding error signal.

6. The system of claim 5, wherein each of the plurality of adaptive filters further comprises a weight vector, representing weighting factors, that is updated based on the corresponding error signal and applied to successive outputs of a tapped delay line of the respective adaptive filter.

7. The system of claim 1, further comprising speech detection circuitry that enables the plurality of adaptive filters in response to detecting speech from the speech source.

8. The system of claim 1, further comprising speech conditioning circuitry that processes the speech output signal to provide a resulting speech signal having an amplitude gain of approximately N.

9. The system of claim 1, wherein each of the plurality of adaptive filters further comprises:

means for filtering data microphone output signals by convolution with a vector of weight values in the frequency domain;

means for comparing the filtered data microphone output signal from one of the data microphones with an output signal from the reference microphone in the frequency domain and deriving therefrom an error signal; and means for adjusting the weight values convolved with the data microphone output signals in the frequency domain to minimize the error signal.

10. The system of claim 9, wherein each of the adaptive filters further includes Fast Fourier Transform means to transform successive blocks of data microphone output signals to a frequency domain representation to facilitate filtering in the frequency domain.

11. The system of claim 1, wherein each of the plurality of adaptive filters is configured to invert an acoustic path transfer function of the corresponding data microphone and apply a reference acoustic path transfer function of the reference microphone to yield the respective adaptively filtered microphone output signal, such that the signal components resulting from the speech source are added by the signal the summation circuit to produce a speech output signal having a corresponding increased amplitude gain.

12. The system of claim 11, further comprising speech conditioning circuitry that convolves the speech output signal with the reference acoustic path transfer function to provide a resulting speech signal having an amplitude gain of approximately N.

13. A system for improving detection of speech signals, the system comprising:

a plurality of bandpass filters that remove a known spectral band containing noise from a plurality of microphone output signals to provide corresponding bandpass filtered output signals, the plurality of microphone output signals corresponding to acoustic signals both from a speech source and from at least one noise source, one of the plurality of microphone output signals designated a reference microphone signal and the other microphone output signals being data microphone signals;

a plurality of adaptive filters, one for each of the data microphone output signals, that adaptively filter respective bandpass filtered output signals for each of the data microphone output signals and provide adaptively filtered output signals that are aligned relative to the reference microphone signal; and a signal summation circuit that sums the adaptively filtered output signals such that speech signal contributions from the data microphones are added coherently to provide a speech output signal having an amplitude gain that approximates a number of the signals being summed by the signal summation circuit and such that signal components resulting from noise combine incoherently to provide a noise signal having an amplitude gain of approximately a square root of the number of the signals being summed by the signal summation circuit to produce a corresponding increased signal-to-noise ratio.

14. The system of claim 13, wherein the plurality of adaptive filters are updated based on the bandpass filtered output signal for the reference microphone output signal.

15. The system of claim 14, wherein each of the plurality of adaptive filters further comprises a summation circuit that subtracts the respective adaptively filtered output signal from the bandpass filtered output signal to provide a corresponding error signal, each of the plurality of adaptive filters adapting to minimize the corresponding error signal.

16. The system of claim 15, wherein each of the plurality of adaptive filters further comprises a weight vector, representing weighting factors, that is updated based on the corresponding error signal and applied to successive outputs of a tapped delay line of the respective adaptive filter.

17. The system of claim 13, wherein each of the plurality of adaptive filters is configured to invert an acoustic path transfer function of a corresponding data microphone and apply a reference acoustic path transfer function of the reference microphone to yield each respective adaptively filtered microphone output signal, such that the summation circuit adds the signal components resulting from the speech source to provide the speech output signal having the amplitude gain.

18. The system of claim 17, further comprising speech conditioning circuitry that convolves the speech output signal with the reference acoustic path transfer function to provide a resulting speech output signal having an amplitude gain of approximately N, where N denotes the number of the signals being summed by the signal summation circuit.

19. The system of claim 13, further comprising speech detection circuitry that enables the plurality of adaptive filters in response to detecting speech from the speech source.

20. A method for improving detection of speech signals, the method comprising:

receiving a plurality of microphone output signals from a plurality of microphones positioned to detect speech from a single speech source and noise from at least one noise source, one of the microphone output signals being designated a reference microphone output signal and the others being designated data microphone output signals, wherein plurality of microphone output signals correspond to acoustic signals both from the speech source and from the at least one noise source;

filtering the microphone output signals in a plurality of bandpass filters to eliminate from the microphone output signals a known spectral band containing noise;

adaptively filtering the microphone output signals to align each of the data microphone output signals with the reference microphone output signal; and combining the adaptively filtered microphone output signals by adding the signal contributions from the speech source coherently to provide a speech amplitude gain that is proportional to a number of signals being added together and by adding the signal components resulting from noise incoherently to provide a noise amplitude gain that is proportional to the square root of the number of signals being added together, whereby a corresponding increased signal-to-noise ratio is produced.

21. The method of claim 20, further comprising conditioning the combined adaptively filtered output signals to reduce reverberation effects in the output signal by modifying the spectrum of the cumulative signal obtained from the signal summation circuit to provide a resulting speech signal having an amplitude gain of approximately N, where denotes the number of signals being added together.

* * * * *